United States Patent
Kopetz

(10) Patent No.: US 7,839,868 B2
(45) Date of Patent: Nov. 23, 2010

(54) COMMUNICATION METHOD AND SYSTEM FOR THE TRANSMISSION OF TIME-DRIVEN AND EVENT-DRIVEN ETHERNET MESSAGES

(75) Inventor: Hermann Kopetz, Baden bei Wien (AT)

(73) Assignee: FTS Computer Technik GmbH, Baden bei wien (AT)

( * ) Notice: Subject to any disclaimer, the term of this patent is extended or adjusted under 35 U.S.C. 154(b) by 835 days.

(21) Appl. No.: 11/010,137

(22) Filed: Dec. 10, 2004

(65) Prior Publication Data

US 2005/0117596 A1 Jun. 2, 2005

(51) Int. Cl.
*H04L 1/00* (2006.01)
*H04L 12/26* (2006.01)
*H04L 12/28* (2006.01)
*H04L 12/56* (2006.01)

(52) U.S. Cl. .................. 370/401; 370/230.1; 370/231; 370/236; 370/398; 370/422; 370/240; 370/407; 370/425

(58) Field of Classification Search .......... 370/401, 370/407, 446, 230, 230.1, 231, 235, 236, 370/240, 398, 422, 425
See application file for complete search history.

(56) References Cited

U.S. PATENT DOCUMENTS

| 5,412,648 | A | * | 5/1995 | Fan | ............... 370/414 |
| 5,694,542 | A | | 12/1997 | Kopetz | |
| 5,887,143 | A | | 3/1999 | Saito et al. | |

(Continued)

FOREIGN PATENT DOCUMENTS

AT 407 582 B 8/2000

(Continued)

OTHER PUBLICATIONS

IEEE Standard 802.3, 2000 Edition, Information Technology, Telecommunications and information exchange between systems, local and metropolitan area networks, specific requirements—Part 3: Carrier Sense Multiple Access with Collision Detection (CSMA/CD) Access Method and Physical Layer Specifications.

(Continued)

*Primary Examiner*—Ronald Abelson
(74) *Attorney, Agent, or Firm*—Anton P. Ness; Fox Rothschild LLP

(57) ABSTRACT

A communication method for transmitting Ethernet messages in a distributed real-time system in which a plurality of network node computers, e.g. four network node computers (111, 112, 113, 114), each comprising at least one communication controller (121, 122, 123, 124), are linked via a communication system comprising one or more communication channels (109), one or more intelligent star couplers (101, 102) being disposed in each communication channel. According to the invention, a distinction is made between conventional Ethernet messages (ET messages) and time-triggered Ethernet messages (TT messages), the TT messages being transported with an a priori known constant delay time ($\Delta$) between transmitter and receiver, and, when there is a time conflict between ET and TT messages, the transport of the ET message that is in conflict being delayed or aborted in order to be able to transport the TT message with the constant delay time ($\Delta$). Furthermore, the invention relates to a corresponding communication system and a star coupler for such a communication system.

23 Claims, 3 Drawing Sheets

U.S. PATENT DOCUMENTS

| | | | |
|---|---|---|---|
| 5,892,762 A * | 4/1999 | Okuda et al. | 370/395.42 |
| 6,141,355 A | 10/2000 | Cruz et al. | |
| 6,411,418 B1 * | 6/2002 | Deri et al. | 398/182 |
| 6,442,135 B1 * | 8/2002 | Ofek | 370/229 |
| 6,754,228 B1 * | 6/2004 | Ludwig | 370/468 |
| 7,110,365 B2 * | 9/2006 | Lee et al. | 370/252 |
| 7,236,796 B2 * | 6/2007 | Soliman | 455/456.1 |
| 2003/0007455 A1 * | 1/2003 | Kohzuki et al. | 370/230.1 |
| 2004/0153859 A1 | 8/2004 | Kopetz | |

FOREIGN PATENT DOCUMENTS

| | | |
|---|---|---|
| AT | 408 383 B | 3/2001 |
| AT | 410 491 B | 9/2002 |
| AT | 411 380 B | 5/2003 |
| EP | 0 596 650 A1 | 5/1994 |
| EP | 0 658 257 B1 | 12/1996 |
| WO | WO 0195550 A2 | 12/2001 |
| WO | WO 0195562 A2 | 12/2001 |

OTHER PUBLICATIONS

Kopetz, Hermann, "Real-Time Systems, Design Principles for Distributed Embedded Applications"; 1997; pp. 45-70; Kluwer Academic Publishers.

Sharon, O., Spratt, M.; "A CSMA/CD Compatible MAC for Real-time Transmissions Based on Varying Collision Intervals"; INFCOM'98; Seventh Annual Meeting Joint Conference of the IEEE Computer and Communication Societies. IEEE, vol. 3; 1998; pp. 1265-1272.

International Search Report dated Oct. 2003 PCT/AT03/00164 (4 pages).

International Preliminary Examination Report, PCT/AT03/00164 dated Feb. 19, 2004 (7 pages) (translation of pertinent portions-4 pages).

International Preliminary Examination Report Supplemental PCT/AT03/00164 mailed Jul. 6, 2004 (4 pages) (translation of pertinent portions-2 pages).

* cited by examiner

COMMUNICATION METHOD AND SYSTEM FOR THE TRANSMISSION OF TIME-DRIVEN AND EVENT-DRIVEN ETHERNET MESSAGES

CROSS-REFERENCE TO RELATED APPLICATIONS

This application claims priority from PCT Patent Application Serial No. AT03/00164, filed 4 Jun. 2003, which claims priority from Austrian Patent Application A895/2002, filed 13 Jun. 2002.

FIELD OF THE INVENTION

The invention relates to a communication method for transmitting Ethernet messages in a distributed real-time system in which a plurality of network node computers, e.g. four network node computers, each comprising at least one communication controller, are linked via a communication system comprising one or more communication channels, one or more intelligent star couplers being disposed in each communication channel, and a distinction being made between conventional Ethernet messages (ET messages) and time-triggered Ethernet messages (TT messages) and the TT messages being transported with an a priori known constant delay time between transmitter and receiver.

BACKGROUND OF THE INVENTION

Such a method is known from WO 01/095550 A.

Furthermore, the invention relates to a star coupler for a communication system for the transmission of Ethernet messages in a distributed real-time system including a plurality of network node computers, e.g. four network node computers, each of which comprises at least one communication controller, the communication system comprising one or more communication channels via which the network node computers are connected to each other and one or more intelligent star couplers being disposed in each communication channel.

In the text to follow, reference is made to the literature indicated below:

[1] U.S. Pat. No. 5,694,542
[2] EP 0 658 257
[3] U.S. Pat. No. 5,887,143
[4] AT 407 582
[5] AT 408 383
[6] Austrian Patent Application 1723/2001
[7] Austrian Patent Application 429/2001
[8] IEEE Ethernet Standard 802.3 at URL: HTTP://standards.ieee.org
[9] Kopetz, H. (1997). Real-Time Systems, Design Principles for Distributed Embedded Applications; ISBN: 0-7923-9894-7. Boston. Kluwer Academic Publishers
[10] Sharon, O., Spratt, M., "A CSMA/CD compatible MAC for real-time transmission based on varying collision intervals". In: INFCOM'98. Seventh Annual Meeting Joint Conference of the IEEE Computer and Communications Societies. Proceedings. IEEE, Volume: 3, 1998, pp. 1265-1272 vol. 3.

In the past twenty years, the IEEE Ethernet Standard 802.3 [8] has gained such wide acceptance that, because of the mass market for Ethernet controllers in the personal computer area, the costs for Ethernet-based communication systems have dropped very sharply. For these cost reasons, Ethernet is also used increasingly in real-time data processing, although the existing Ethernet protocol possesses no good real-time properties, such as minimal jitter.

A CSMS/CD system is known from [10] in which messages are subdivided into such low and high priority, the message with high priority being given the preference when there is a conflict between two messages.

However, the real-time properties of the Ethernet protocol cannot be substantially improved with the procedure proposed here by itself.

One object of the invention is to enable the transmission of Ethernet messages with good real-time properties.

This objective is achieved using a method of the type mentioned at the outset, in that according to the invention, when there is a time conflict between ET and TT messages, the transport of the ET message that is in conflict is aborted in order to be able to transport the TT message with the constant delay time.

Furthermore, the objective mentioned at the outset is achieved using a star coupler mentioned at the outset that is set up according to the invention to distinguish between conventional Ethernet messages (ET messages) and time-triggered Ethernet messages (TT messages), to transport the TT messages having an a priori known constant delay time between transmitter and receiver, whereby, when there is a time conflict between ET and TT messages, the transport of the ET message that is in conflict is aborted in order to be able to transport the TT message with the constant delay time.

In contrast to the "non pre-emptive" solution disclosed in [10], in the present invention it is not necessary to wait for the end of the transmission of a message having low priority; rather, the low priority message is aborted in order to be able to transmit the high-priority message ("pre-emptive"). As a result it is also not necessary to wait on the maximum run time of messages having low priority, and the constant latency can thus also be kept short.

Also in WO 01/095550 A, such a solution according to the invention is not shown; there, when there is a time conflict between ET and TT messages, the transport of the ET message in conflict is merely delayed.

By guaranteeing a constant delay time, it is possible to achieve a high control engineering precision. The constant delay time is therefore of special significance for the reason that, as is known from the theory of clock synchronization, the variability of the delay time (this is the difference between the maximum and minimum delay times) makes the precision of the clock synchronization worse. An a priori known constant delay time can be considered in the clock synchronization algorithm and therefore has no effect on the precision of the clock synchronization. An imprecise clock synchronization brings about a poor time basis because the granularity of the global time must be greater than the precision of the clock synchronization. A coarse granularity of the clocks brings about an imprecise time resolution of events. Furthermore, the variability of the delay time also determines the precision of the synchronization of distributed actions in a distributed computer system.

The present invention makes it possible to improve substantially the real-time properties of a communication system. This new communication system supports the parallel operation of event-triggered and time-triggered Ethernet messages in a single communication system. In the following, the classical Ethernet messages are characterized as ET (event-triggered) messages and the time-triggered Ethernet messages as TT (time-triggered) messages. The TT messages have a constant delay time and minimal jitter.

The following significant economic advantages are produced by the invention. The minimal jitter of the TT-messages enables the development of closed-loop control circuits of high control engineering quality. The TT messages enable the development of a global time with good precision. Global time supports the generation of precise local time stamps in the data acquisition and makes it possible to improve the temporal specification of the interfaces. Moreover, conventional Ethernet controllers may be used without modification.

The method of the invention can be produced especially simply if the constant delay time is selected in such a manner that the output channels of the star coupler may be cleared for the transport of the TT message to be received.

In one embodiment, there is an indication in a designated field of the message of whether the message is a TT message or is an ET message.

Furthermore, an optional time field that indicates the transmission instant of the message may be contained within a TT message.

In this context it is advantageous if it is already established by a priori planning that a time interval of at least the constant delay time is observed between the transport of two TT messages.

Furthermore, the aforementioned objective is achieved using a system mentioned at the outset that is set up according to the invention to distinguish between conventional Ethernet messages Ethernet (ET messages) and time-triggered Ethernet messages (TT messages) and to transport the TT messages with an a priori known constant delay time between transmitter and receiver, whereby, when there is a time conflict between ET and TT messages, the transport of the ET message that is in conflict is aborted in order to be able to transport the TT message with the constant delay time.

As already mentioned above, it is advantageous if the constant delay time is selected in such a manner that the output channels of the star coupler can be cleared within this delay time for the transport of the incoming TT message.

Moreover, it may be provided that there is an indication in a designated field of the message of whether the message is a TT message or an ET message.

Furthermore, an optional time field that indicates the transmission time of the message may be contained within a TT message. In this context it is advantageous if it is already established by a priori planning that a time interval of at least the constant delay time is observed between the transport of two TT messages.

In a concrete embodiment of the communication systems, a configuration message is provided a priori to the star coupler specifying times during which messages received by the star coupler are TT messages.

In this context, the star coupler distinguishes between TT messages and ET messages and transports the TT messages with an a priori known constant delay time, and, when there is a time conflict between ET and TT messages, it aborts the transport or the ET message that is in conflict in order to be able to transport the TT message with the constant delay time.

Provision is then made that after the on-time transmission of a TT message the star coupler re-transmits the ET message that was in conflict and was aborted. Furthermore, it may be provided that the star coupler synchronizes its local clock using the time field contained within a TT message.

In this context, it is especially beneficial if the star coupler in a fault-tolerant manner synchronizes its local clock using the time fields contained within a plurality of TT messages. In addition, it may be provided that the star coupler is connected to the replicated star couplers within a cluster of network node computers via a dedicated unidirectional channel on which all TT messages that the star coupler transports are output.

In addition, it is also still possible that the star coupler, on the basis of its local time, checks whether the TT message arrives within an a priori known time window around the instant of transmission, and the star coupler, when it receives a TT message early or late, garbles the message in such a manner that all correct receivers detect the message as faulty. The star coupler decodes each TT message and re-codes it on the basis of its local timing module.

The star coupler reads one or more selected fields of TT messages and checks during the delay time whether the content of these fields corresponds to known criteria that were communicated a priori to the star coupler via a configuration message. If it does not correspond, the message is garbled in such a manner that all correct receivers detect the message as faulty. Moreover, provision is also made according to the invention that the communication controller synchronizes its local clock using the time field contained within a TT message.

The communication controller in a fault-tolerant manner synchronizes its local clock using the time fields contained within a plurality of TT messages. Moreover, the communication controller autonomously transmits a TT message accepted by an application executed on a network node computer as soon as the transmission instant indicated in the time field in the message is reached.

Moreover, provision is made that the communication controller distinguishes between ET and TT messages, and the communication controller provides the ET messages to the local application software corresponding to the event semantics, a new message being placed in a waiting queue from which it is read in a consumptive manner by the application software, and the communication controller provides TT messages to the local application software corresponding to the status semantics, a new message replacing the old one and the reading by the local application software occurring in a non-consumptive manner.

Finally, the communication controller has two or more communication channels on which identical copies of a TT message are provided, and the one communication operation is considered successful if a valid TT message is received on time on at least one of these redundant channels.

BRIEF DESCRIPTION OF THE DRAWINGS

The invention is explained in below in reference to the drawing. Shown are.

DETAILED DESCRIPTION OF THE INVENTION

In the next section, an embodiment of the new method is shown by an example with four network node computers, which are connected via two replicated star couplers.

Figure 1:
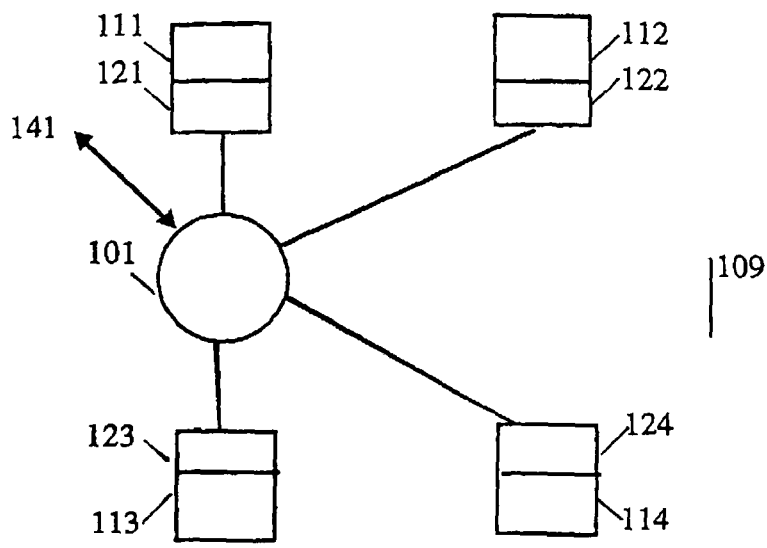
FIG. 1 the structure of a distributed computer system with a star coupler.

FIG. 1 shows a distributed computer system with a star coupler. It comprises four network node computers 111, 112, 113, and 114, each of which has a communication controller 121, 122, 123, and 124 with one bi-directional communication channel connection each, and which are connected via a communication system comprising a communication channel 109. Located in this communication channel is an intelligent star coupler 101 for the central control of communication. The star coupler 101 can be initialized and observed via an optional, separate communication channel 141.

Figure 2:
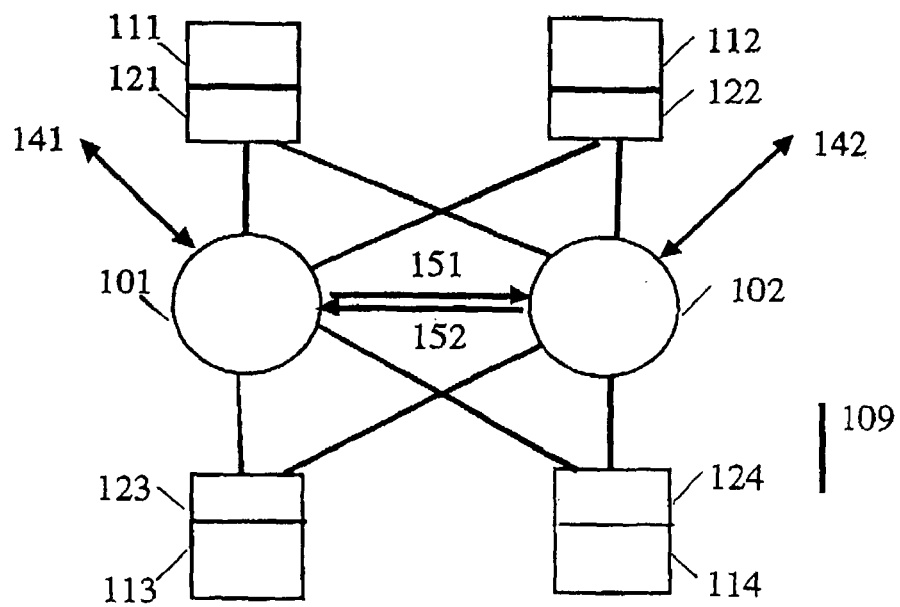
FIG. 2 the structure of a distributed computer system with two star couplers, FIG. 3 the structure of a standardized normal Ethernet message, FIG. 4 the structure of a standardized expanded Ethernet message, FIG. 5 the structure of a TT Ethernet message, and FIG. 6 the bit arrays of a TT parameter field of the TT Ethernet message.

FIG. 2 shows a distributed fault-tolerant computer system having two star couplers. It is comprised of four network node computers 111, 112, 113 and 114, each of which has a communication controller 121, 122, 123 and 124 with two bi-directional communication channel connections each. Each of these communication channel connections is connected to an intelligent star coupler 101 and 102, which carry out the central control of communication. Star coupler 101 is able to transmit its messages via channel 151 to star coupler 102 and can be initialized and observed via separate communication channel 141. Star coupler 102 is able to transmit its messages via channel 152 to star coupler 101 and can be initialized and observed via separate communication channel 142.

Figure 3:
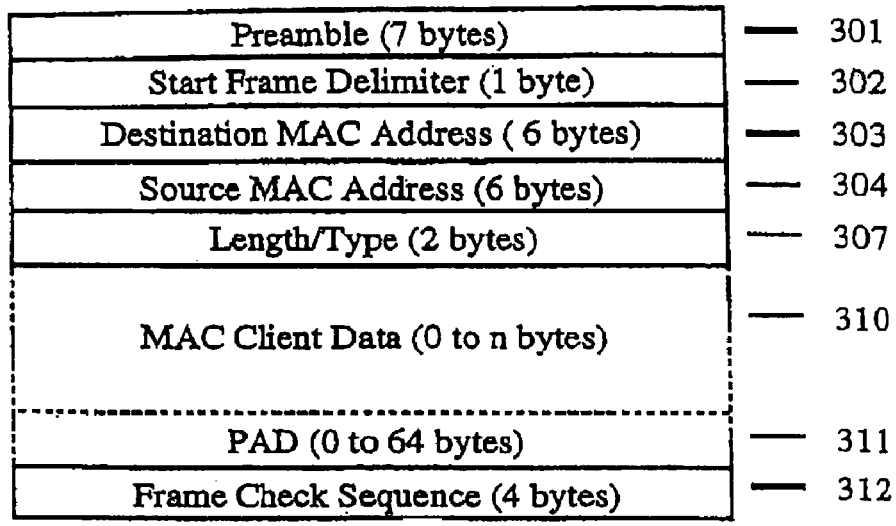
Figure 4:
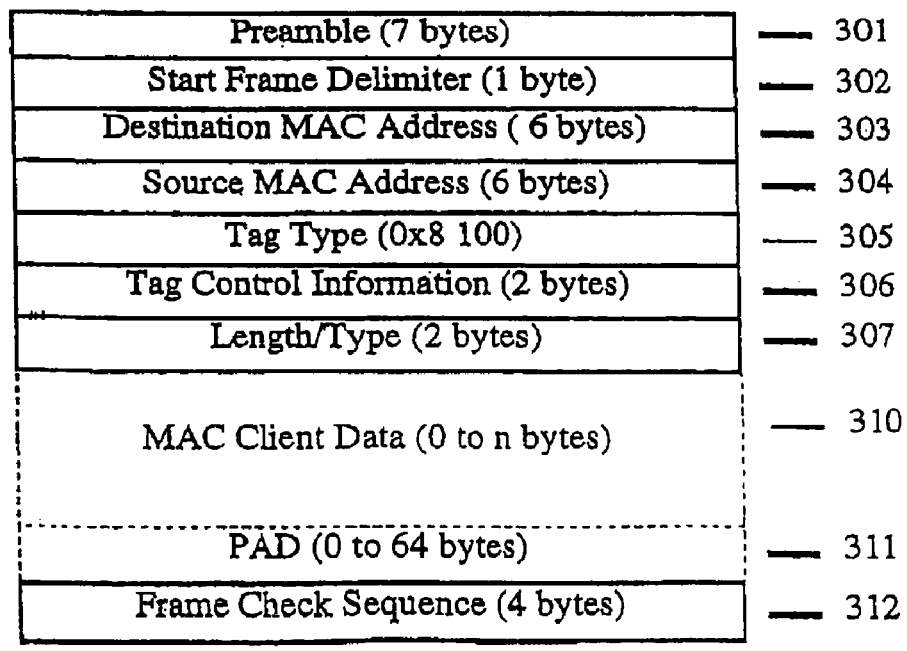
Figure 5:
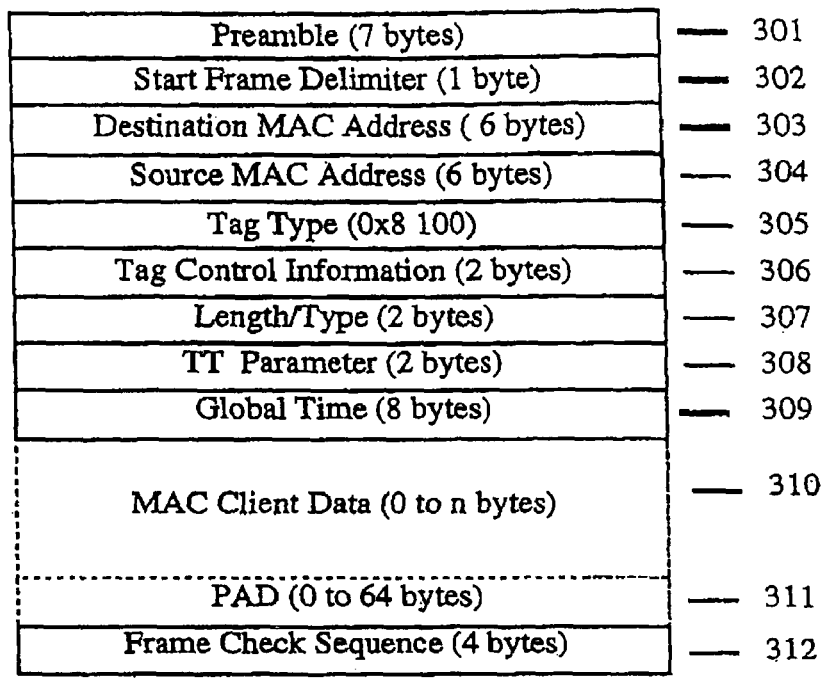

FIG. 3 shows the structure of a normal Ethernet message standardized according to [8]. Situated after a preamble 301 with a length of 7 bytes are start delimiter field 302, target address 303, transmitter address 304, message length or type of message 307, variable data field 310, optional PAD field 311, with which short messages are extended, and frame-check sequence 312. FIG. 4 shows the structure of an expanded Ethernet message standardized according to [8]. In addition to the fields described in FIG. 3, an identifier for the expanded message is located in field 305 and a tag-type field is located in field 306. In this tag-type field, the user may determine the priority of a message. The highest priority may be used according to the present invention for the identification of a TT message. Such an identifier conforms to the Ethernet standard [8]. It should be pointed out that in the Ethernet standard the code allowance for field 305 is not yet fully utilized, and therefore this field could also used for the identification of a TT message. FIG. 5 shows the structure of a TT Ethernet message. In addition to the fields described in FIG. 4, in field 308 a TT parameter field is introduced and in field 309 the optional transmission instant of the TT message is indicated. A standardized Ethernet controller available on the market reads user-specific data fields in fields 308 and 309. In TT parameter field 308 is information pertaining to the structure and the type of the TT message.

Figure 6:
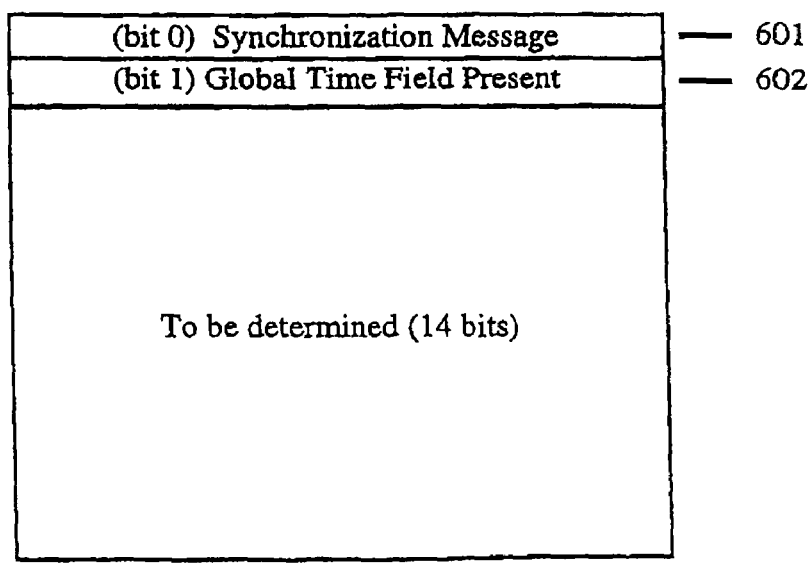

FIG. 6 shows the contents of the bit arrays of TT parameter field 308. If the bit is set in field 601 (low-order bit), this means that the transmission instant in field 309 is contained in the TT message. If the bit is set in field 602, this means that the message comes from a transmitter having a precise clock time and may be used for clock synchronization.

If a network node computer, e.g. 111, wants to transmit a TT message, it sets the code for a TT message in message field 306 and transmits the message. Alternatively, the application software running on a network node computer can set bit 601 in the message and write the desired transmission point in field 309 of the message. The start of transmission can then autonomously occur precisely at established transmission instant 309 via an Ethernet communication controller. If the transmitter sets the bit of the message, then the message contains an especially precise time indication, which can be used for the clock synchronization of the other controllers.

The star coupler analyzes an incoming message and using field 306 determines whether a TT message or an ET message is arriving. In the case of a TT message, the star coupler determines the desired output channel on the basis of field 303, e.g. at node 114 in FIG. 1. If an ET message is sent directly on this channel, then the star coupler aborts this transmission operation immediately and clears the channel to node 114 within a known constant delay time $\Delta$ for the further transport of the TT message that is just arriving. Delay time $\Delta$ must be selected to be long enough that in each case the output channel can be cleared within this delay time $\Delta$ for the transport of the TT message. Within the context of an a priori planning of the TT communication, it must be ensured that the interval between consecutive TT messages is greater than delay time $\Delta$. In the individual case, the star coupler precisely observes this constant delay time $\Delta$ between the beginning of the reception of a TT message and the beginning of the transmission of a TT message. If the star coupler has aborted the transport of an ET message that is in conflict, it can re-transmit the aborted ET message after the on-time transport of the TT message. The star coupler can also take on guardian functions, as are described in [4], in order to detect and isolate faulty messages and thereby prevent the propagation of errors. If a TT message in field 309 obtains the transmission instant, then the star coupler can check whether the message arrives according to [6] within a known tolerance interval around the transmission instant and reject the message if this is not the case. Alternatively, the input channels on which TT messages are expected and at what instants can be communicated to the star coupler via channel 141 using a configuration message transmitted a priori. This information redundancy in a fault-tolerant system prevents a faulty computer node from entering an incorrect transmission time. Because the star coupler codes the message on the basis of its own oscillator and its own power supply on the output, the forwarding of an SOS fault from the transmitter to the receiver [4] is stopped. The star coupler can initially synchronize its local clock in that it measures the beginning of the reception of a TT message and sets its clock in such a manner that at this reception instant it would have accepted the value of global time 309, which is contained in the message [5].

A continuous fault-tolerant clock synchronization may be realized as follows: with each synchronization message marked in field 602, the star coupler determines the interval between the reception instant of the synchronization message measured with its local clock and the transmission instant [5] contained in field 309 of the message.

This interval is a measure for the deviation of the clock of the receiver from the clock of the transmitter. If a number of such messages is present, then it is possible for the correction factor for the clock of the star coupler to be calculated using a known fault-tolerant synchronization algorithm, as described in [9] on p. 61. Such a fault-tolerant synchronization method may also be realized in the hardware of the star coupler [1]. In a fault-tolerant system [2, 3], in which replicated communication channels corresponding to FIG. 2 are present, each star coupler can send all TT messages via a dedicated connection channel (151 for star coupler 101 and 152 for star coupler 102) to the other star coupler, so that the latter may also synchronize its clock if no message arrives at its own input. In a fault-tolerant system, the star coupler, within delay time $\Delta$, can check the content of data field 310 of the message corresponding to criteria reported to it via a configuration message in order to detect data fields of the transmitter. A message detected as faulty is not forwarded by the star coupler.

If a receiving communication controller finds the transmission instant in field 309 of the arriving TT message, it can synchronize its local clock, in that it measures the beginning of the reception of the message and its clock is set in such a manner that at this reception instant it would have accepted the value of global time 309 contained in the message plus constant delay interval A caused by the star coupler [5]. A continuous fault-tolerant clock synchronization can be realized as follows: with each synchronization message marked in field 602, the communication controller determines the interval between the reception instant of the synchronization message measured with its local clock and the transmission instant contained in field 309. It shortens this interval by the known delay interval A of the star coupler. This shortened interval is a measure for the deviation of the clock of the receiver from the clock of the transmitter. If a number of such messages is present, then it is possible, using a known fault-tolerant synchronization algorithm, as described in [9] on p. 61, for the correction factor for the clock of the star coupler to be calculated. Such a fault-tolerant synchronization method may also be realized in the hardware of the receiving communication controller [1]. If the application software of a computer node, e.g. 111, enters the intended transmission instant of the message in message field 309, an expanded communication controller according to the invention can autonomously set up the beginning of the transmission [2,3] at precisely the correct transmission instant. At the interface between the received communication controller, e.g. 121, and the application software, an expanded communication controller can provide ET messages and TT messages differently. ET messages normally contain information about events and must be processed according to the event semantics [7]. The event semantics require that arriving messages be temporarily stored in a waiting queue and be transferred exactly one time to the user process. TT messages normally contain status data that can be provided in accordance with the status semantics in a common memory. The reception of a new TT message overwrites the memory value of an older TT message by the same name. The receiving process reads status data in a non-consumptive manner. In a fault-tolerant system that provides a plurality of multiple independent communication channels, e.g. via two channels as in FIG. 2, messages are sent in a replicated manner. In such a system, the communication is successful if at least one of the replicated message copies arrives at the receiver.

Finally, it should be noted that the previously described concrete implementation of the integration of time-triggered and event-triggered messages in the Ethernet represents only one of many possible implementation variants of the invention.

For example, it is possible to derive the decision of whether a message arriving at the star coupler is a TT message not from the message content in field 306 or field 305, but from the instant of reception of a message at the star coupler. In such a case, when and on which channel a TT message is expected must be reported to the star coupler a priori via a configuration message. The same is true for the communication controller.

It is an essential characteristic of this invention that existing commercially available Ethernet controllers can send and receive time-triggered messages without modification.

What is claimed is:

1. A communication method for the transmission of Ethernet messages in a distributed real-time system in which a plurality of network node computers, each of which comprises at least one communication controller, are connected via a communication system that comprises one or more communication channels, one or more intelligent star couplers being disposed in each communication channel, and a distinction being made between conventional Ethernet messages (ET messages) and time-triggered messages (TT messages), and the TT messages are transported with an a priori known constant delay time ($\Delta$) between transmitter and receiver, wherein the constant delay time ($\Delta$) is selected in such a manner that within this delay time ($\Delta$) the output channels of the star coupler for the transport of the incoming TT message can be cleared, wherein when there is a time conflict between ET and TT messages, the transport of the ET message that is in conflict is aborted in order to be able to transport the TT message with the constant delay time ($\Delta$).

2. The method as described in claim 1, wherein in an outstanding field of the message a designation is made of whether the message is a TT or an ET message.

3. The communications method as described in claim 1, wherein the transmission instant of the message is indicated via an optional time field contained in a TT message.

4. The communication method as described in claim 1, wherein it is determined via an a priori planning that a time interval of at least the constant delay time ($\Delta$) between the transport of two TT messages is observed.

5. A star coupler for a communication system for the transmission of Ethernet messages in a distributed real-time system comprising a plurality of network node computers, each of which comprises at least one communication controller, the communication system comprising one or more communication channels via which the network node computers are connected to each other, and one or more intelligent star couplers being disposed within each communication channel, wherein it is equipped to distinguish between conventional Ethernet messages (ET messages) and time-triggered Ethernet messages (TT messages) and to transport the TT messages having an a priori known constant delay time ($\Delta$) between transporter and receiver, and wherein the constant delay time ($\Delta$) is selected in such a way that within this delay time ($\Delta$) the output channels of the star coupler can be cleared for the transport of the incoming TT message, whereby, when there is a time conflict between ET and TT messages, the ET message in conflict is aborted in order to be able to transport the TT message with the constant delay time ($\Delta$).

6. The star coupler as described in claim 5, wherein, in an indicated field of the message, a designation is made of whether the message is a TT message or an ET message.

7. The star coupler as described in claim 5, wherein an optional time field that indicates the transmission instant of the message is contained in a TT message.

8. The star coupler as described in claim 5, wherein it is determined via an a priori planning that a time interval of at least the constant delay time ($\Delta$) between the transport of two TT messages is observed.

9. The star coupler as described in claim 5, wherein a configuration message is provided a priori to the star coupler specifying times during which messages received by the star coupler are TT messages.

10. The star coupler as described in claim 5, wherein it distinguishes between TT messages and ET messages and transports the TT messages and ET messages with an a priori known constant delay time ($\Delta$) and, when there is a time conflict between ET and TT messages, aborts the transport of the ET message that is in conflict, in order to be able to transport the TT messages with the constant delay time ($\Delta$).

11. The star coupler as described in claim 5, wherein it re-transmits the ET message that was in conflict and aborted after the on-time transmission of a TT message.

12. The star coupler as described in claim 5, wherein the star coupler synchronizes its local clock using the time field contained in a TT message.

13. The star coupler as described in claim 5, wherein, in a fault-tolerant manner, it synchronizes its local clock using the time fields contained within a plurality of TT messages.

14. The star coupler as described in claim 5, wherein it is connected via a dedicated unidirectional channel, on which all TT messages that are transported to the star coupler are output, to the replicated star couplers within a cluster of network node computers.

15. The star coupler as described in claim 5, wherein, for each TT message, it checks on the basis of its local time whether the TT message arrives within an a priori known time window around the transmission instant contained in the message and which, when a TT message arrives early or late, garbles the message in such a manner that all correct receivers detect the message as faulty.

16. The star coupler as described in claim 5, wherein it decodes each TT message and re-codes it on the basis of its local timing module.

17. A communication system for the transmission of Ethernet messages in a distributed real-time system comprising a plurality of network node computers, each of which comprises at least one communication controller, the communication system comprising one or more communication channels via which the network node computers are connected to each other, and one or more intelligent star couplers being disposed within each communication channel, characterized by a star coupler as described in claim 5.

18. The communication system as described in claim 17, wherein the communication controller synchronizes its local clock using the time field contained in a TT message.

19. The communication system as described in claim 17, wherein the communication controller in a fault-tolerant manner synchronizes its local clock using the time fields contained within a plurality of TT messages.

20. The communication system as described in claim 17, wherein the communication controller autonomously transmits a TT message accepted by an application running on a network node computer as soon as the transmission instant indicated in the time field in the message is reached.

21. The communication system as described in claim 17, wherein the communication controller distinguishes between ET and TT messages, and the communication controller provides the ET messages to the local application software corresponding to the event semantics, a new message being placed in a waiting queue from which it is read in a consumptive manner by the application software, and the communication controller provides TT messages to the local application software corresponding to the status semantics, a new message replacing the old one, and the reading by the local application software occurring in a non-consumptive manner.

22. The communication system as described in claim 17, wherein the communication controller has two or more communication channels on which identical copies of a TT message are provided and the one communication operation is considered successful if a valid TT message is received on time on at least one of these redundant channels.

23. A star coupler for a communication system for the transmission of Ethernet messages in a distributed real-time system comprising a plurality of network node computers, each of which comprises at least one communication controller, the communication system comprising one or more communication channels via which the network node computers are connected to each other, and one or more intelligent star couplers being disposed within each communication channel, wherein it is equipped to distinguish between conventional Ethernet messages (ET messages) and time-triggered Ethernet messages (TT messages) and to transport the TT messages having an a priori known constant delay time ($\Delta$) between transporter and receiver, whereby, when there is a time conflict between ET and TT messages, the ET message in conflict is aborted in order to be able to transport the TT message with the constant delay time ($\Delta$), wherein the star coupler reads one or more selected fields of TT messages and checks during the delay time ($\Delta$) whether the content of these fields corresponds to known criteria that were communicated a priori to the star coupler via a configuration message and which, if it does not correspond, garbles the message in such a manner that all correct receivers detect the message as faulty.

* * * * *